(12) United States Patent
Takasaka

(10) Patent No.: US 6,978,959 B2
(45) Date of Patent: Dec. 27, 2005

(54) MAGNETIC RECORDING/REPRODUCING APPARATUS AND ELECTRIC APPARATUS

(75) Inventor: Daisuke Takasaka, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 91 days.

(21) Appl. No.: 10/690,356

(22) Filed: Oct. 21, 2003

(65) Prior Publication Data
US 2004/0079826 A1   Apr. 29, 2004

(30) Foreign Application Priority Data
Oct. 21, 2002   (JP) .............................. 2002-006637

(51) Int. Cl.[7] ............................................. G11B 15/32
(52) U.S. Cl. ....................... 242/356; 360/96.3; 74/405; 74/406
(58) Field of Search ...................... 242/356; 360/96.3; 74/405, 406

(56) References Cited

FOREIGN PATENT DOCUMENTS

JP           U3086328       *   3/2002   ........... G11B 15/44

* cited by examiner

*Primary Examiner*—John Q. Nguyen
(74) *Attorney, Agent, or Firm*—Osha•Liang LLP

(57) ABSTRACT

A magnetic recording/reproducing apparatus or an electric apparatus includes a reel gear, an intermediate gear, a swing arm, an idler gear and an input gear. The swing arm, idler gear and input gear constitute an idler mechanism. The intermediate gear is arranged apart from the reel gear. The swing arm is arranged between the reel gear and the intermediate gear. The swing arm is swingable between the reel gear and the intermediate gear around a center axis. The idler gear is attached to the swing arm. The idler gear is continuously kept in contact with at least one of the reel gear and the intermediate gear. The input gear is rotatable about the center axis, and is brought into contact with the idler gear.

5 Claims, 5 Drawing Sheets

Prior Art

MAGNETIC RECORDING/REPRODUCING APPARATUS AND ELECTRIC APPARATUS

BACKGROUND OF THE INVENTION

1. Field of the Invention

This invention relates to a magnetic recording/reproducing apparatus and an electric apparatus, and more particularly to a magnetic recording/reproducing apparatus and an electric apparatus which are simple in structure and capable of reducing their production cost.

2. Description of the Related Art

Conventionally, a magnetic tape apparatus such as a video cassette recorder is known as an example of magnetic recording/reproducing apparatus or an electric apparatus. The magnetic tape apparatus is provided with a pair of reels for forwardly and inversely rotating a pair of tape reels on a tape supply side and a tape take-up side, which are accommodated in a tape cassette. In order to change the rotating direction of the reels, an idler mechanism is employed. A structure of the idler mechanism is known in which an idler gear attached to a swing arm is displaced to swing between a first position where rotation is transmitted to the one reel and a second position where the rotation is transmitted to the other reel.

In such an idler mechanism, in order to swing the idler gear between the first position and the second position, a rotating torque (swinging torque) which exerts on the swing arm must be generated. Conventionally, in order to generate such the swinging torque, for example, a spring is arranged so as to press the idler gear toward the swing arm.

As a mechanism for generating the swinging torque without using such a spring, an idler mechanism as disclosed in Japanese Utility Model Registration No. 3086328 (FIGS. 1 and 2) has been proposed. FIG. 9 is a schematic view of the main part of a magnetic tape apparatus which adopts the conventional idler mechanism disclosed in Japanese Utility Model Registration No. 3086328. FIG. 10 is a schematic partially broken enlarged side view of the idler mechanism taken along line X—X in FIG. 9. Now referring to FIGS. 9 and 10, the idler mechanism of the conventional magnetic tape apparatus will be described briefly.

As shown in FIGS. 9 and 10, the conventional idler mechanism includes a pair of reels 181, 182 for rotating tape reels of a tape cassette, gears 183, 184 which are concentrically attached to the reels 181, 182, respectively, a train of gears 185 and an idler mechanism 106. The train of two gears 185 are in mesh with a gear 184.

The idler mechanism 106 includes an input gear 162, a swing arm 164 rotatably connected to one end of a center axis 163 of the input gear, and an idler gear 161 in mesh with the input gear 162 in an area 170 (see FIG. 10). The center axis 163 is rotatably fit in a hole 165 of the swing arm 164. The idler gear 161 has a bearing hole 167 formed at the central portion (FIG. 10). In the bearing hole 167 of the idler gear 161, a shaft portion 166 (FIG. 10) which is formed to protrude at the end of the swing arm 164 is inserted. The idler gear 161 is rotatable about the shaft portion 166. The input gear 162 has a flange integrally formed. The flange 168 has a slanting side face 169. At a single position (concretely, below the area 170 where the input gear 162 and idler gear 161 are in mesh with each other), the side face 169 and the idler gear 161 are in contact with each other.

In the idler mechanism shown in FIGS. 9 and 10, since the idler gear 161 is in contact with the side face 169 of the flange 168 of the input gear 162, when the input gear 162 rotates, because of the friction resistance generated at the contact area, the rotating torque for moving the idler gear 161 is generated. Specifically, by changing the rotating direction of the input gear 162, switching can be made between the state where the reel 181 is rotated by the idler gear 161 and the state where the reel 182 is rotated by the idler gear 161 (the swing arm 164 can be displaced to swing about the center axis 163).

However, the conventional idler mechanism described above presents the following problem. Specifically, the idler mechanism in which the spring is arranged to press the idler gear on the swing arm has a complicated structure and requires an increased number of components because of the spring as a separate component. Therefore, the production cost of the magnetic tape apparatus is increased.

In the idler mechanism shown in FIGS. 9 and 10, although the separate member such as a spring is not employed, the input gear 162 having a specific shape equipped with the flange 168 is employed. Therefore, the production cost of the input gear 162 having the specific shape may become higher than that of a usual gear. As a result, the production cost of the entire magnetic tape apparatus cannot be reduced sufficiently.

SUMMARY OF THE INVENTION

This invention has been accomplished to solve the problem as described above. An object of this invention is to provide a magnetic recording/reproducing apparatus and an electric apparatus provided with an idler mechanism that is relatively simple in structure and can be reduced in cost.

As a result of various investigations of the structure of an idler mechanism by the inventors of this invention, this invention has been accomplished. Specifically, where a swing gear is swung between two gears, the distance between the two gears is determined so that the swing gear is kept in contact with at least one of the two gears, and a drive gear (which is a gear for driving a swing gear) having a center at the same position as the rotating center of a swing arm for holding a swing gear is arranged. The rotating direction of the drive gear is determined so as to be the same as the direction in which the swing arm is to be rotated (moved). In this way, without using the gears having a specific shape as the swing gear and the drive gear, the swing arm can be moved in the same direction as the rotating direction of the drive gear. This was confirmed by experiment.

On the basis of the above discovery by the inventors, a magnetic recording/reproducing apparatus according to this invention uses a magnetic tape cassette having a pair of tape reels and includes one and the other reels, one and the other reel gears, an intermediate gear, a swing arm, a swing gear and a drive gear. The swing arm, swing gear and drive gear constitute the idler mechanism. The one reel drives the one tape reel of the magnetic tape cassette. The other reel drives the other tape reel of the magnetic tape cassette. The one reel gear is connected to the one reel and is rotatable about the same center axis as the one reel. The other reel gear is connected to the other reel and rotatable about the same center axis as the other reel.

The intermediate gear is arranged between the one reel gear and the other reel gear and apart from the one reel gear. The intermediate gear serves to drive the other reel gear. The swing arm is arranged between the one reel gear and the intermediate gear. The swing arm is swingable between the reel gear and the intermediate gear about a swing central axis. The swing gear is attached to the swing arm and being kept in contact with at least one of the one reel gear and the intermediate gear. The drive gear is rotatable about the swing central axis. The drive gear is in contact with the swing gear and drives the swing gear.

By bringing the swing gear into contact with the one reel gear, the one reel is driven through the swing gear and the one reel gear. In this case, the drive gear rotates so that a contact area between the swing gear and the drive gear moves from the intermediate gear side toward the one reel gear side.

Further, by bringing the swing gear into contact with the intermediate gear, the other reel is driven through the swing gear, the intermediate gear and the reel gear. In this case, the drive gear rotates so that a contact area between the swing gear and the drive gear moves from the one reel gear side toward the intermediate gear side.

In this way, when the drive gear rotates, the rotating torque for moving the swing gear is generated in the rotating direction of the drive gear at the contact area between the drive gear and swing gear. By continuously rotating the drive gear so that the contact area between the swing gear and the drive gear moves toward the one reel gear, the state where the swing gear is in contact with the one reel gear can be kept. Further, likewise, by continuously rotating the drive gear so that the contact area between the swing gear and drive gear moves toward the intermediate gear, the state where the swing gear is in contact with the intermediate gear can be kept.

Further, where the swing gear is swung from the one reel gear toward the intermediate gear, by rotating the drive gear in the inverse direction(in which the contact area between the swing gear and drive gear moves toward the intermediate gear), the rotating torque can be generated in the rotating direction of the drive gear (direction toward the intermediate gear) at the contact area between the drive gear and swing gear. Therefore, the swing gear rotates in the direction opposite to the case where the one reel gear is driven, and the swing arm moves from the one reel gear to the intermediate gear.

Since the swing gear is continuously kept in contact with at least one of the one reel gear and intermediate gear, where the swing gear moves toward the intermediate gear while the swing gear rotates in the direction opposite to where the swing gear drives the one reel gear, the swing gear is kicked out from the one reel gear at the contact area between the swing gear and one reel gear. At substantially the same time, the swing gear bites the intermediate gear at the contact area between the swing gear and intermediate gear. After the swing gear has bitten the intermediate gear, as in the case where the one reel gear and swing gear have been in contact with each other, by rotation of the drive gear, the rotating torque for pressing the swing gear and swing arm in the direction of the rotating direction (direction toward the intermediate gear) of the drive gear at the contact area between the drive gear and swing gear can be generated. Therefore, the swing gear can be kept in contact with the intermediate gear. Further, where the swing gear is swung from the intermediate gear to the one reel gear, by changing the rotating direction of the drive gear again, in the same process described above, the swing gear can be moved to the one reel gear.

Accordingly, in accordance with this invention, without using a spring for bringing the swing gear into contact with the swing arm, and without forming the shape of the gear in a specific shape, the idler mechanism which is simple in structure and can be manufactured at low cost can be realized.

An electric apparatus according to this invention includes a first gear, a second gear, a swing arm, a swing gear and a drive gear. The swing arm, swing gear and drive gear constitute an idler mechanism. The second gear is arranged apart from the first gear. The swing arm is arranged between the first gear and the second gear. The swing arm is swingable between the first gear and the second gear about a swing center axis. The swing gear is attached to the swing arm. The swing gear is continuously kept in contact with at least one of the reel gear and the intermediate gear. The drive gear is rotatable about the swing central axis and in contact with the swing gear. The drive gear drives the swing gear.

In this way, when the drive gear rotates, the force (rotating torque) for moving the swing gear is generated in the rotating direction of the drive gear at the contact area between the drive gear and swing gear. Therefore, by continuously rotating the drive gear so that the contact area between the swing gear and the drive gear moves toward the first gear, the state where the swing gear is in contact with the one reel gear can be kept.

Further, where the swing gear is moved (swung) from the first gear toward the second gear, by simply rotating the drive gear in the inverse direction(in which the contact area between the swing gear and drive gear moves toward the second gear), the rotating torque can be generated in the rotating direction of the drive gear (direction toward the intermediate gear) at the contact area between the drive gear and swing gear. Therefore, the swing gear rotates in the direction opposite to the case where the first gear is driven, and the swing arm moves from the first gear to the second gear. Further, since the swing gear is continuously kept in contact with at least one of the first gear and second gear, where the swing gear moves toward the second gear while the swing gear rotates in the direction opposite to where the swing gear has been driven the first gear, the swing gear is kicked out from the first gear at the contact area between the swing gear and first gear. In addition, the swing gear bites the second gear at the contact area between the swing gear and second gear. After the swing gear has bitten the intermediate gear (the swing gear and the second gear have been brought into mesh with each other), as in the case where the first gear and swing gear have been in contact with each other, by rotation of the drive gear, the force (rotating torque) for pressing the swing gear and swing arm in the direction of the rotating direction (direction toward the second gear) of the drive gear at the contact area between the drive gear and swing gear can be generated. Therefore, the swing gear can be kept in contact with the second gear.

Accordingly, in accordance with this invention, without using a spring for bringing the swing gear into contact with the swing arm, and without forming the shape of the gear in a specific shape, the idler mechanism for swinging the swing gear between the first gear and the second gear can be realized.

In the electric apparatus, where the first gear is driven by bringing the swing gear into contact with the first gear, preferably, the drive gear rotates so that a contact area between the swing gear and the drive gear moves from the second gear toward the first gear. Further, where the second gear is driven through the swing gear by bringing the swing gear into contact with the second gear, preferably, the drive gear rotates so that a contact area between the swing gear and the drive gear moves from the first gear to the second gear.

In this case, by rotation of the drive gear, the torque for pressing the swing arm and swing gear can be generated in the rotating direction of the drive gear at the contact area between the swing gear and drive gear. Thus, where the first gear and second gear are driven, respectively, the swing gear can be surely kept in mesh with the first gear or second gear.

In the magnetic recording/reproducing apparatus and electric apparatus described above, in the swing arm, the swing center axis may be arranged at one end of the swing arm. The swing gear may be rotatably arranged at the other end on the side opposite to the one end of the swing arm where the swing center axis is arranged.

In this configuration, the size of the swing arm can be made smaller than the case where the swing gear is arranged at the center in the longitudinal direction of the swing arm. As a result, the idler mechanism can be made compact, and hence the magnetic recording/reproducing apparatus or electric apparatus can be downsized.

Preferably, the electric apparatus further includes one reel and the other reel for rotating a pair of tape reels of a magnetic tape cassette. The first gear may serve to drive the one reel, and the second gear may serve to drive the other reel.

In this way, if the idler mechanism of the electric apparatus according to this invention is employed as a mechanism for changing the drive reel in the pair of reels (one reel and the other reel) for driving the magnetic tape cassette, simplifying structure of the magnetic tape apparatus as an electric apparatus using the magnetic tape cassette and reduction in its production cost can be realized.

DETAILED DESCRIPTION OF THE PREFFERED EMBODIMENTS

Figure 1:
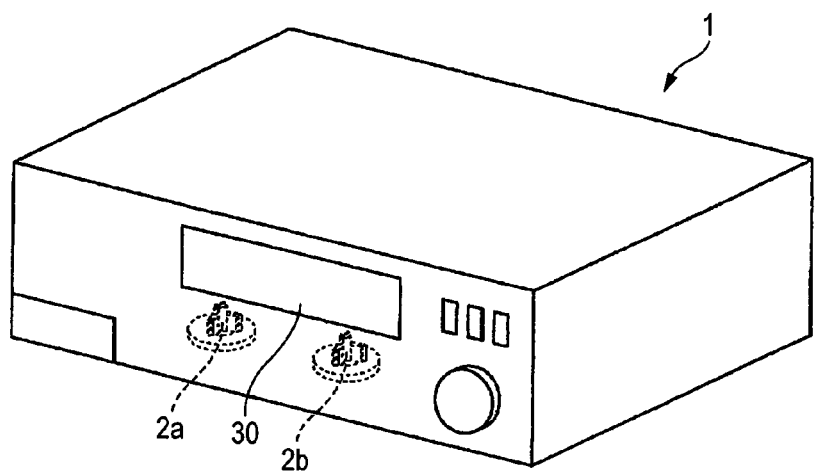
FIG. 1 is a perspective schematic view of a video cassette recorder according an embodiment of the invention.

Now referring to the drawings, an explanation will be given of the mode for carrying out this invention. Incidentally, in the following drawings, like reference numerals refer to like parts.

Figure 2:
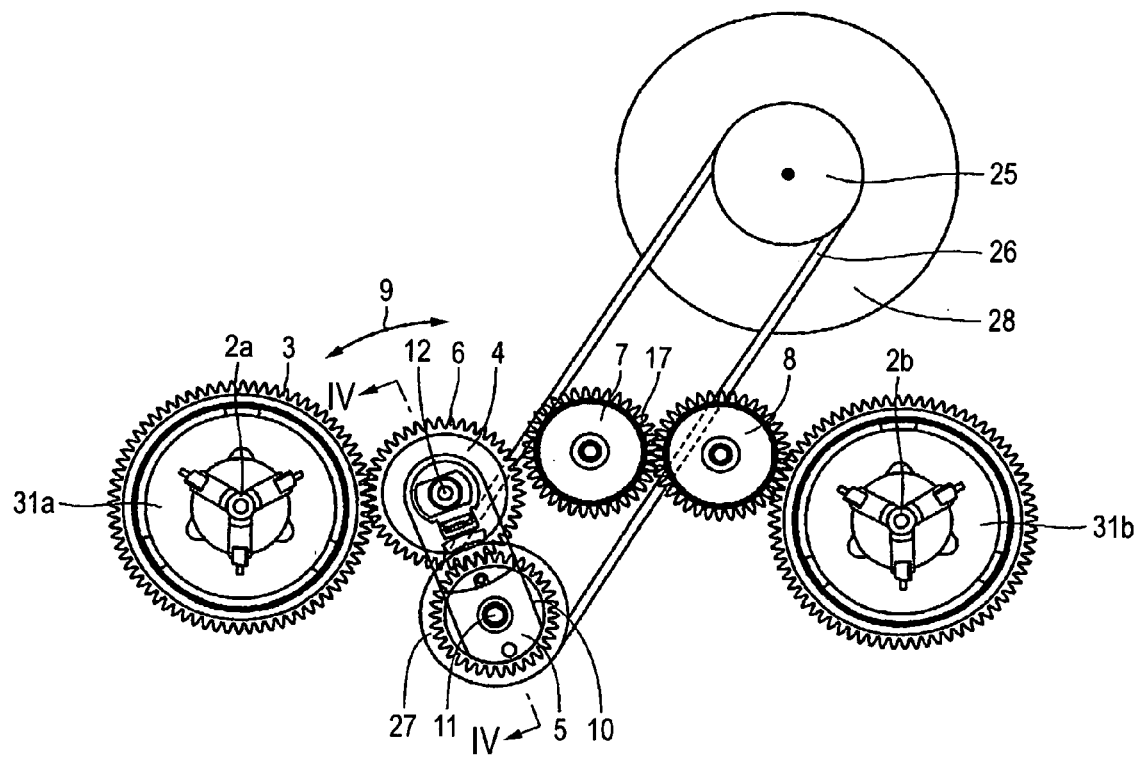
FIG. 2 is a schematic view showing an idler mechanism for driving reels incorporated in the video cassette recorder shown in FIG. 1.
Figure 3:
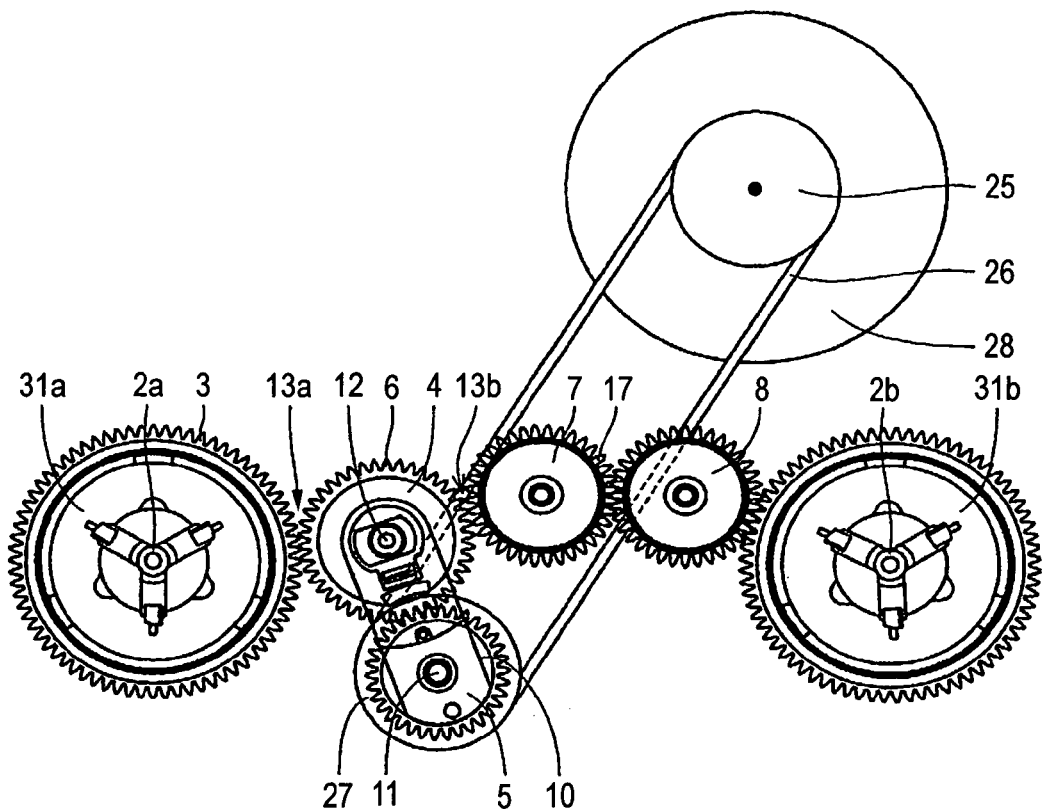
FIG. 3 is a schematic view for explaining the feature of the idler mechanism shown in FIG. 2.
Figure 4:
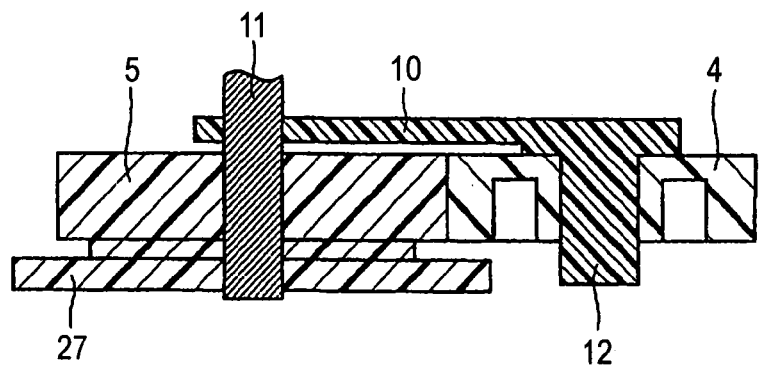
FIG. 4 is a sectional schematic view of a swing portion of the idler mechanism taken along line IX—IX in FIG. 2.

FIG. 1 is a perspective schematic view of a video cassette recorder according to this invention. FIG. 2 is a schematic view showing the idler mechanism for driving the reels incorporated in the video cassette recorder shown in FIG. 1. FIG. 3 is a schematic view for explaining the feature of the idler mechanism shown in FIG. 2. FIG. 4 is a sectional schematic view of a swing portion of the idler mechanism taken along line IX—IX. Referring to FIGS. 1 to 4, the video cassette recorder according to this invention will be explained.

As shown in FIG. 1, a video cassette recorder 1 which is an embodiment of a magnetic recording/reproducing apparatus or electric apparatus according to this invention incorporates two reels 2a, 2b. These reels 2a, 2b serve to rotate normally and inversely tape reels of a video cassette, which is a tape cassette, inserted into the video cassette recorder 1 from a video insertion inlet 30.

As seen from FIG. 2, the idler mechanism for driving the reels 2a, 2b which are the one reel and the other reel includes a motor 28 for driving the reels 2a, 2b, an input gear 5 which serves as a drive gear driven by the motor 28, an idler gear 4 which serves as a swing gear driven by the input gear 5, and intermediate gears 7, 8 for transferring the driving force by the idler gear 4 to the reel 2b. The reel 2a is connected to a reel gear 31a that serves as the one reel gear. The reel 2a rotates in linkage with the reel gear 31a. The reel 2b is connected to a reel gear 31b that serves as the other reel gear. The reel 2b rotates in linkage with the reel gear 31b. The shaft rotated by the motor 28 is connected to a driving pulley 25. The driving pulley 25 rotates with the rotation of the motor 28. The input gear 5 is connected to an input pulley 27. The input gear 5 rotates together with the input pulley 27. The driving pulley 25 connected to the motor 28 and the input pulley 27 are coupled with each other by a belt 26.

As seen from FIG. 2, the idler gear 4 is arranged so as to be adjacent to the input gear 5. The idler gear 4, as shown in FIG. 4, is attached to a center axis 12 formed in a swing arm 10 so that it can rotate with respect to the center axis 12. The swing arm 10 is swingable in a direction shown by arrow about the center axis 11 of the input gear 5 (FIG. 2). The idler gear 4 rotates with the rotation of the input gear 5.

Where the reel 2a is rotated, the swing arm 10 is rotated to the side of the reel 2a around the center axis 11 which serves as a swinging center. As a result, the teeth 6 of the idler gear 4 become in mesh with the teeth 3 of the reel gear 31a (FIG. 2) which serves as the first gear. In this state, when the motor 28 rotates, the reel 2a rotates the driving pulley 25, belt 26, input pulley 27, input gear 5, idler gear 4 and reel gear 31a.

Where the reel 2b is rotated, by the swinging operation of the swing arm 10 described later, the idler gear 4 rotates around the center axis 10 to move toward the intermediate gear 7 which serves as the second gear. Thus, the teeth 6 of the idler gear 4 become in mesh with the teeth 17 of the intermediate gear 7 (FIG. 2). In addition, at this time, a gap is defined between the idler gear 4 and reel gear 31a. As a result, when the motor 28 rotates, the reel 2b rotates through the driving pulley 25, belt 26, input pulley 27, input gear 5, idler gear 4, intermediate gear 7 and reel gear 31b (FIG. 2).

As seen from FIG. 3, the distance between the reel gear 31a and intermediate gear 7 is determined so that the teeth 6 of the idler gear 4 can be kept continuously in mesh with at least one of the teeth 3 of the reel gear 31a and the teeth 17 of the intermediate gear 7 at at least one of meshing portions 13a and 13b. In other words, in the idler mechanism according to this embodiment, a state where the teeth 6 of the idler gear 4 are not in contact with both the teeth 3 of the reel gear 31a and the teeth of the intermediate gear 7 does not occur. Further, as shown in FIG. 3, in the idler mechanism according to this embodiment, where the idler gear 4 is located at a substantially middle point when it swings about the center axis 11, the teeth 6 of the idler gear 4 are in a state where it can mesh with both the teeth 3 of the reel gear 31a and the teeth 17 of the intermediate gear 7.

In the idler mechanism of the video cassette recorder 1 shown in FIGS. 1 to 4, when the input gear 5 rotates, a rotating torque occurs toward the rotating direction of the input gear 5 at the contact area between the input gear 5 and idler gear 4. Therefore, if the input gear is continuously rotated so that the contact area between the idler gear 4 and input gear 5 moves towards the reel gear 31*a*, the reel gear 31*a* and the idler gear 4 can be kept in contact with each other.

Further, as described later, where the idler gear 4 is swung from the reel gear 31*a* toward the intermediate gear 7, by simply rotating the input gear 5 in the inverse direction (direction in which the contact area between the idler gear 4 and input gear 5 moves toward the intermediate gear 7), the rotating torque can be generated in the rotating direction of the input gear 5 (direction toward the intermediate gear 7) at the contact area between the input gear 5 and idler gear 4. Therefore, the idler gear 4 rotates in the inverse direction to which it has been driving the reel gear 31*a*, and the swing arm 10 rotates to move from the reel gear 31*a* to the intermediate gear 7. Further, since the idler gear 4 is kept in contact with at least one of the reel gear 31*a* and intermediate gear 7, where the idler gear 4 rotates to move toward the intermediate gear 7 in the inverse direction to which the idler gear 4 has been driving the reel gear 31*a*, the idler gear 4 is kicked out from the reel gear 31*a* at the contact area between the idler gear 4 and the reel gear 31*a*. At the same time, the idler gear 4 bites the intermediate gear 7 at the contact area between the idler gear 4 and the intermediate gear 7. After the idler gear 4 has bitten the intermediate gear 7 SO that the teeth 6 and 17 mesh with each other (FIG. 2), as in the case where the reel gear 31*a* and idler gear 4 have been in contact with each other, by rotation of the input gear, the rotating torque for pressing the swing arm 10 and idler gear 4 in the direction of the rotating direction (direction toward the intermediate gear 7) of the idler gear at the contact area between the idler gear 5 and idler gear 4 can be generated. Therefore, the idler gear 4 can be kept in contact with the intermediate gear 7.

As understood from the description hitherto made, in the video cassette recorder 1 according to this embodiment, without using a spring for bringing the idler gear 4 into contact with the swing arm 10, the idler mechanism can be realized. Further, in the video cassette recorder 1 according to this embodiment, it is not necessary to form the shape of the gear constituting the idler mechanism in a specific shape. Therefore, the idler mechanism which can be reduced in the number of components and is simple in structure, the production cost of the video cassette recorder 1 can be reduced.

In the video cassette recorder 1 (FIG. 1) shown in FIGS. 1 to 4, where the reel 2*a* is driven (the reel gear 31*a* is driven), as described previously, the input gear 5 rotates so that the contact area between the idler gear 4 and the input gear 5 moves from the intermediate gear 7 toward the reel gear 31*a*. Further, where the reel 2*b* is driven (intermediate gear 7 is driven), the input gear 5 rotates so that the contact area between the idler gear 4 and the input gear 5 moves from the reel gear 31*a* toward the intermediate gear 7. In this case, by the rotation of the input gear 5, the torque of pressing the swing arm 10 and idler gear 4 to move in the rotating direction of the input gear 5 can be generated. Thus, where the reel gear 31*a* or intermediate gear 7 is driven, the idler gear 4 is surely kept in mesh with the reel gear 31*a* or intermediate gear 7.

In the video cassette recorder 1 according to this embodiment, as shown in FIG. 2, the center axis 11 serving as the swing center axis is arranged at the one end of the swing arm 10. The idler gear 4 is arranged at the other end located on the side opposite to the one end where the center axis 11 is arranged so that it can rotate around a center axis 12. Thus, the idler mechanism can be realized using the swing arm having a length substantially equal to the distance between the center axis 12 of the idler gear 4 and the center axis 11 of the input gear 5, thereby making the idler mechanism compact.

Referring to FIGS. 5 to 8, a concrete explanation will be given of the swinging operation of the idler mechanism shown in FIG. 2.

Figure 5:
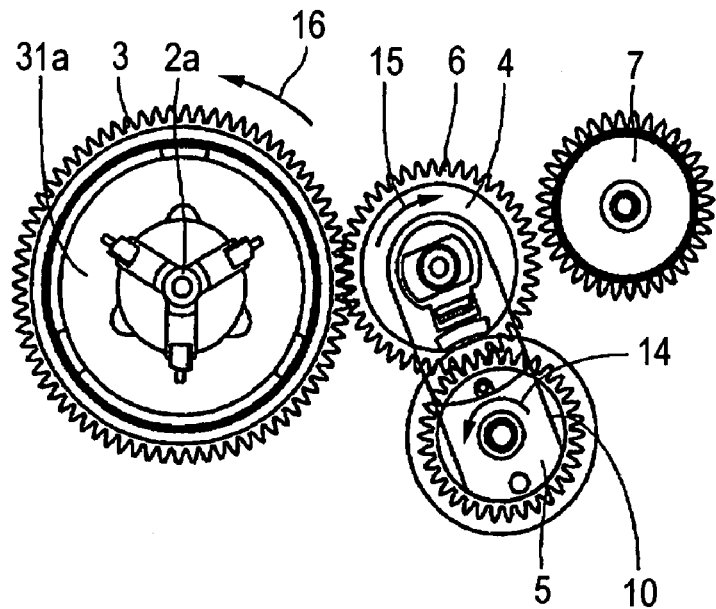
FIG. 5 is a schematic view showing a status where the reel rotates.

FIG. 5 is a schematic view showing the status where the reel 2*a* rotates. In this case, the input gear 5 rotates in the direction of arrow 14. Concurrently, the idler gear 4 rotates in the direction of arrow 15. The reel gear 31*a* and reel 2*a* to which the rotation of the idler gear 4 has been transmitted rotate in the direction of arrow 16.

Figure 6:
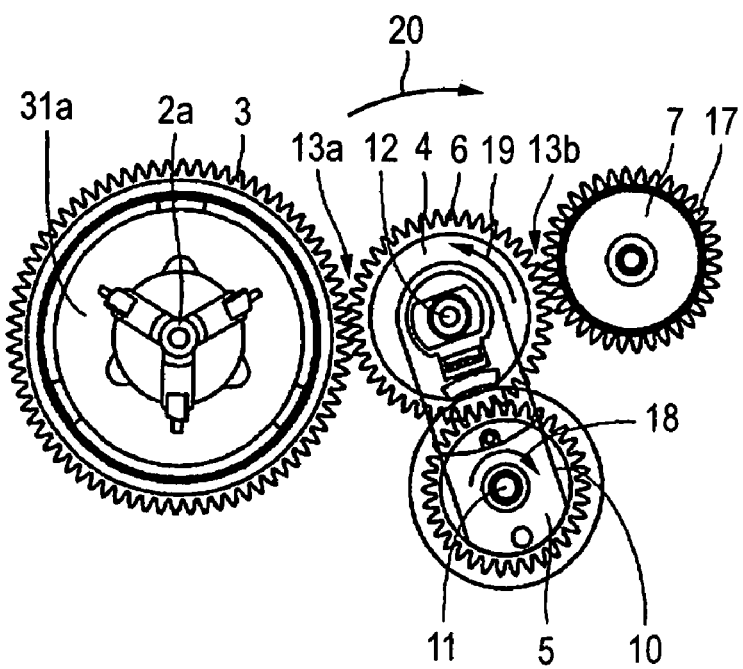
FIG. 6 is a schematic view showing a swinging operation of the idler mechanism.
Figure 7:
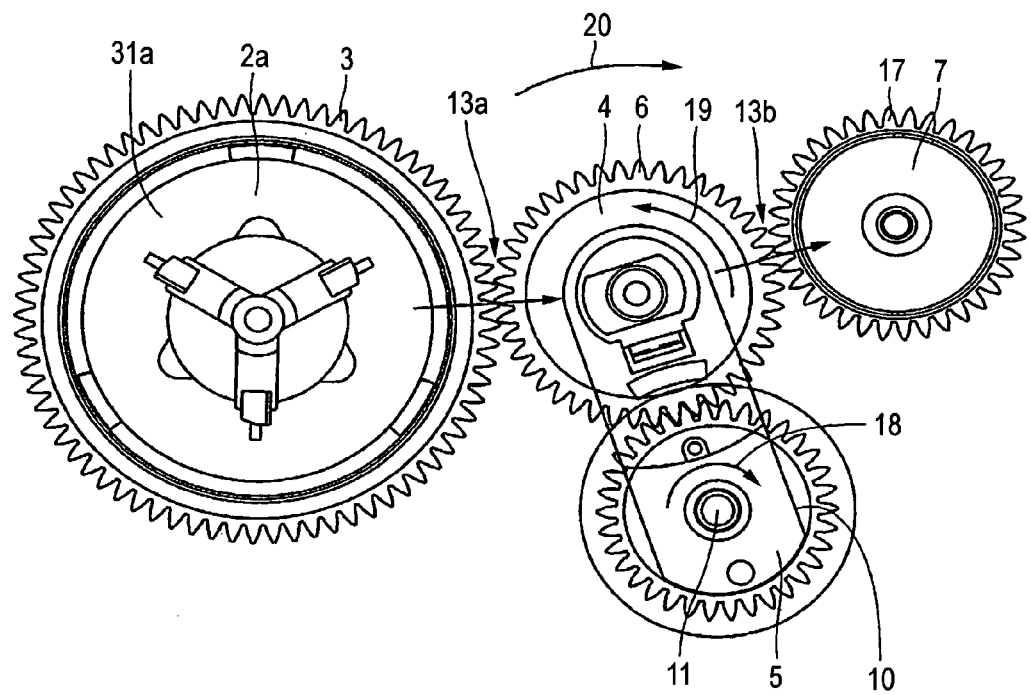
FIG. 7 is an enlarged schematic view for explaining the swinging operation of the idler mechanism.

Next, in order to drive the reel 2*b* (FIG. 2), the motor 28 (FIG. 2) is rotated in the inverse direction to the case shown in FIG. 5. Then, as shown in FIG. 6, the input gear 5 rotates in the direction of arrow 18. Therefore, the idler gear 4 rotates in the direction of arrow 19. FIG. 6 is a schematic view showing the swinging operation of the idler mechanism. The force of rotating the swing arm 10 in the direction of arrow 20 around the center axis 11 exerts on the swing arm 10. As a result, as shown in FIG. 7, the swing arm 10 moves in the direction of arrow 20. Incidentally, FIG. 7 is an enlarged schematic view for explaining the swinging operation of the idler mechanism.

At this time, as shown in FIG. 7, at a meshing portion 13*a*, the teeth 6 of the idler gear 4 are kicked out from the teeth 3 of the reel gear 31*a* with the rotation of the swing arm 10 in the direction of arrow 20. On the other hand, at substantially the same timing, the teeth 6 of the idler gear 4 mesh with the teeth 17 of the intermediate gear 7 at a meshing portion 13*b*.

Figure 8:
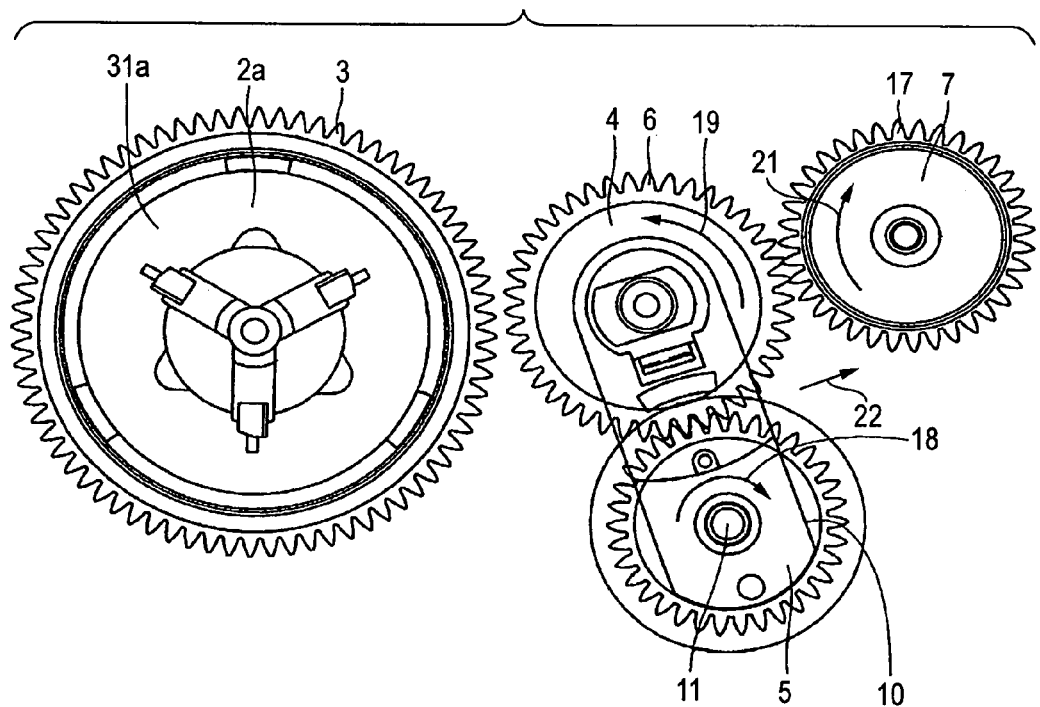
FIG. 8 is a schematic view showing the swinging operation of the idler mechanism.
Figure 9:
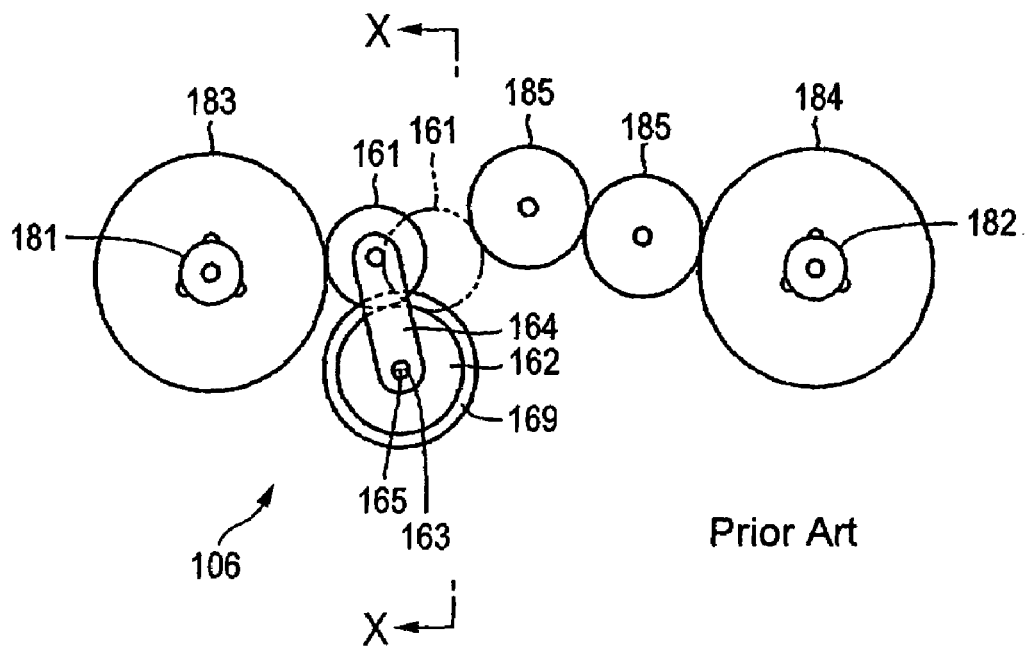
FIG. 9 is a schematic view showing a main part of a magnetic tape apparatus provided with a conventional idler mechanism.
Figure 10:
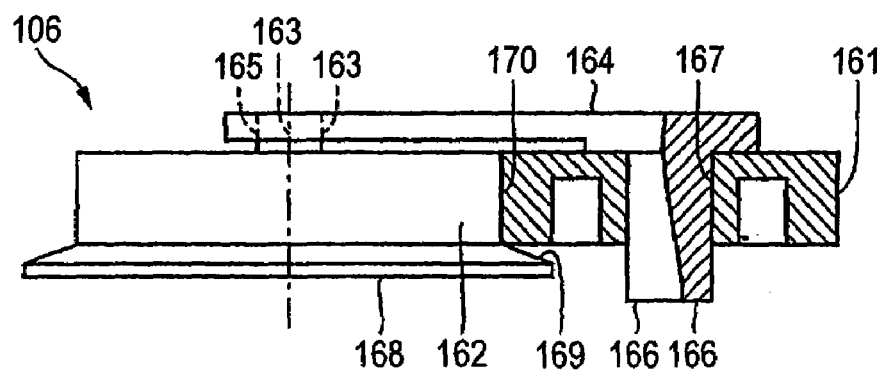
FIG. 10 is a schematic partially broken enlarged side view of the idler mechanism taken along line X—X in FIG. 9.

Thereafter, as shown in FIG. 8, when the input gear 5 continues to rotate in the direction of arrow 18, the swing arm 10 is in a state where it has been pressed in the direction of arrow 22. As a result, the intermediate gear 7 rotates in the direction of arrow 21 with the rotation of the idler gear 4 in the direction of arrow 19. The other reel gear 31*b* (FIG. 2) and the other reel 2*b* (FIG. 2) are driven through the intermediate gear 8 (FIG. 2). In this way, the swinging operation of the idler mechanism is carried out. Incidentally, FIG. 8 is a schematic view showing the swinging operation of the idler mechanism.

It should be noted that the mode for carrying out the invention described above is exemplary and not limitative. The scope of this invention is defined by not the description hitherto made but claims. This invention intends to include all the modifications in the meaning and scope equivalent to claims.

In accordance with this invention, the idler gear which swings between the first and the second gear is arranged so that it is continuously kept in contact with at least one of the first and second gears, and the drive gear in contact with the idler gear is arranged. In this configuration, the idler gear can be swung by the rotation of the drive gear. As a result, it is not necessary to employ the specific component such as a spring for pressing the idler gear on the swing arm. Accordingly, it is possible to reduce the production cost of the magnetic recording/reproducing apparatus or electric apparatus using the idler mechanism.

What is claimed is:

1. A magnetic recording/reproducing apparatus used with a magnetic tape cassette having a pair of tape reels, comprising:
   first and second reels for driving the tape reels of the magnetic tape cassette;
   a first reel gear connected to the first reel and being rotatable about the same center axis as that of the first reel;
   a second reel gear connected to the second reel and being rotatable about the same center axis as that of the second reel;
   an intermediate gear arranged between the first reel gear and the second reel gear to be apart from the first reel gear, the intermediate gear driving the second reel gear;
   a swing arm arranged between the first reel gear and the intermediate gear, the swing arm being swingable between the first reel gear and the intermediate gear about a swing central axis;
   a swing gear attached to the swing arm and being continuously kept in contact with at least one of the first reel gear and the intermediate gear; and
   a drive gear being rotatable about the swing central axis, and being in contact with the swing gear to drive the swing gear;
   wherein where the first reel is driven through the swing gear and the first reel gear by bringing the swing gear into contact with the first reel gear, the drive gear rotates so that a contact area between the swing gear and the drive gear moves from the intermediate gear side toward the first reel gear side; and
   where the second reel is driven through the swing gear, the intermediate gear and the second reel gear by bringing the swing gear into contact with the intermediate gear, the drive gear rotates so that the contact area between the swing gear and the drive gear moves from the first reel gear side toward the intermediate gear side.

2. An electric apparatus comprising:
   a first gear;
   a second gear arranged apart from the first gear;
   a swing arm arranged between the first gear and the second gear, the swing arm being swingable between the first gear and the second gear about a swing center axis;
   a swing gear attached to the swing arm and being continuously kept in contact with at least one of the first gear and the second gear; and
   a drive gear being rotatable about the swing central axis for driving the swing gear, and being in contact with the swing gear.

3. The electric apparatus according to claim 2, wherein where the first gear is driven by bringing the swing gear into contact with the first gear, the drive gear rotates so that a contact area between the swing gear and the drive gear moves from the second gear side toward the first gear side; and
   where the second gear is driven through the swing gear by bringing the swing gear into contact with the second gear, the drive gear rotates so that a contact area between the swing gear and the drive gear moves from the first gear side toward the second gear side.

4. The electric apparatus according to claim 2, wherein the swing center axis is arranged at one end of the swing arm; and
   the swing gear is arranged at the other end of the swing arm, which is opposite to the one end of the swing arm.

5. The electric apparatus according to claim 2, further comprising first and second reels for rotating a pair of tape reels of a magnetic tape cassette;
   wherein the first gear driving the first reel; and
   the second gear driving the second reel.

* * * * *